United States Patent
Matsumoto et al.

(10) Patent No.: US 12,129,327 B2
(45) Date of Patent: Oct. 29, 2024

(54) MALEIMIDE-BASED COPOLYMER, METHOD FOR PRODUCING SAME, AND RESIN COMPOSITION OBTAINED USING SAME

(71) Applicant: Denka Company Limited, Tokyo (JP)

(72) Inventors: Masanori Matsumoto, Ichihara (JP); Tetsuo Noguchi, Ichihara (JP); Kohhei Nishino, Ichihara (JP)

(73) Assignee: Denka Company Limited, Tokyo (JP)

( * ) Notice: Subject to any disclaimer, the term of this patent is extended or adjusted under 35 U.S.C. 154(b) by 0 days.

(21) Appl. No.: 18/160,991

(22) Filed: Jan. 27, 2023

(65) Prior Publication Data

US 2023/0235101 A1 Jul. 27, 2023

Related U.S. Application Data

(62) Division of application No. 16/764,314, filed as application No. PCT/JP2019/000201 on Jan. 8, 2019, now Pat. No. 11,584,809.

(30) Foreign Application Priority Data

Jan. 9, 2018 (JP) .................. 2018-001146

(51) Int. Cl.
*B29C 45/00* (2006.01)
*C08F 8/32* (2006.01)
*C08F 222/40* (2006.01)
*C08F 234/00* (2006.01)
*C08L 9/06* (2006.01)
*B29K 25/00* (2006.01)
*B29K 33/00* (2006.01)
*B29K 33/20* (2006.01)
*B29K 55/02* (2006.01)
*B29K 79/00* (2006.01)
*B29L 31/30* (2006.01)

(52) U.S. Cl.
CPC ............ *C08F 8/32* (2013.01); *B29C 45/0001* (2013.01); *C08F 222/40* (2013.01); *C08F 234/00* (2013.01); *C08L 9/06* (2013.01); *B29K 2025/08* (2013.01); *B29K 2033/08* (2013.01); *B29K 2033/20* (2013.01); *B29K 2055/02* (2013.01); *B29K 2079/08* (2013.01); *B29L 2031/3005* (2013.01)

(58) Field of Classification Search
CPC ................... C08F 8/32; B29C 45/0001
See application file for complete search history.

(56) References Cited

U.S. PATENT DOCUMENTS

| | | | |
|---|---|---|---|
| 4,381,373 A | 4/1983 | Ikuma | |
| 4,404,322 A | 9/1983 | Saito et al. | |
| 5,218,069 A | 6/1993 | Enomoto et al. | |
| 5,290,836 A * | 3/1994 | Truyen | C08L 55/02 524/125 |
| 5,756,576 A * | 5/1998 | Bruls | C08L 25/08 525/70 |
| 5,948,858 A * | 9/1999 | Dorrestijn | C08F 220/44 525/66 |
| 6,153,712 A | 11/2000 | Yamaguchi et al. | |
| 6,599,978 B1 | 7/2003 | Shikisai et al. | |
| 2006/0280878 A1* | 12/2006 | Suezaki | G03F 7/033 428/1.1 |
| 2009/0081462 A1* | 3/2009 | Miyoshi | C08J 5/043 428/407 |
| 2010/0160505 A1* | 6/2010 | Kumazawa | C08L 35/06 525/190 |
| 2010/0324231 A1 | 12/2010 | Yamashita et al. | |
| 2011/0319567 A1* | 12/2011 | Noguchi | C08L 55/02 525/379 |
| 2015/0183991 A1* | 7/2015 | Yamamoto | C08K 5/1539 524/133 |
| 2017/0029620 A1* | 2/2017 | Sato | C08J 5/00 |
| 2017/0218196 A1* | 8/2017 | Naito | C08L 69/00 |
| 2017/0326846 A1* | 11/2017 | Nakaya | B05D 7/02 |
| 2017/0335999 A1* | 11/2017 | Ochiai | C08L 51/06 |

FOREIGN PATENT DOCUMENTS

| | | |
|---|---|---|
| CN | 101367902 A | 2/2009 |
| CN | 101889028 | 11/2010 |
| CN | 105778003 A | 7/2016 |

(Continued)

OTHER PUBLICATIONS

Section 7.3 Ch7 of Hiemenz, P.C., 1984. Polymer Chemistry: The Basic Concepts Marcel Dekker. Inc. New York and Basel, pp. 211-215. (Year: 1984).

Office Action mailed Jun. 16, 2022, issued in corresponding Chinese Application No. 201980005131.X, filed Jan. 8, 2019, 16 pages.

International Search Report mailed Feb. 12, 2019, issued in corresponding International Application No. PCT/JP2019/000201, filed Jan. 8, 2019, 4 pages.

(Continued)

*Primary Examiner* — Nicholas R Krasnow

(74) *Attorney, Agent, or Firm* — Christensen O'Connor Johnson Kindness PLLC

(57) ABSTRACT

This maleimide-based copolymer contains 40-60 mass % of aromatic vinyl monomer units, 5-20 mass % of vinyl cyanide monomer units, and 35-50 mass % of maleimide monomer units, and is such that a 4 mass % tetrahydrofuran solution of the copolymer has a transmittance of 90% or more for light having a wavelength of 450 nm at an optical path length of 10 mm, and the residual maleimide-based monomer amount is less than 300 ppm. This maleimide-based copolymer preferably further contains 0-10 mass % of unsaturated dicarboxylic acid anhydride monomer units, and preferably has a glass transition temperature of 165° C. or higher.

2 Claims, No Drawings

(56) References Cited

FOREIGN PATENT DOCUMENTS

| | | |
|---|---|---|
| EP | 2388282 | 11/2011 |
| JP | S5798536 | 6/1982 |
| JP | S57125242 | 8/1982 |
| JP | H06-248017 A | 9/1994 |
| JP | H09-221522 | 8/1997 |
| JP | H11-60640 | 3/1999 |
| JP | 2002-338608 | 11/2002 |
| JP | 2004-339280 | 12/2004 |
| JP | 2004339280 A | 12/2004 |
| JP | 2007009228 | 1/2007 |
| JP | 2012-025786 A | 2/2012 |
| JP | 2015145479 | 8/2015 |
| JP | 2016-014794 | 1/2016 |
| WO | WO99/060040 A1 | 11/1999 |
| WO | 2011018993 | 2/2011 |

OTHER PUBLICATIONS

Extended European Search Report mailed Jan. 20, 2021, issued in corresponding European Application No. 19738358.1, filed Jan. 8, 2019, 7 pages.

* cited by examiner

MALEIMIDE-BASED COPOLYMER, METHOD FOR PRODUCING SAME, AND RESIN COMPOSITION OBTAINED USING SAME

CROSS-REFERENCES TO RELATED APPLICATIONS

This application is a divisional of U.S. patent application Ser. No. 16/764,314, filed May 14, 2020, which is a national stage of PCT/JP2019/000201, filed Jan. 8, 2019, which claims priority to Japanese Application No. 2018-001146, filed Jan. 9, 2018, each of which is hereby incorporated by reference in its entirety.

TECHNICAL FIELD

The present invention relates to a maleimide-based copolymer, a method for producing the same, and a resin composition using the same.

BACKGROUND ART

An acrylonitrile-butadiene-styrene copolymer resin (ABS resin) is widely used in automobiles, home appliances, OA equipment, home building materials, daily necessities and the like by utilizing its excellent mechanical strength, appearance, chemical resistance, moldability and the like. For applications requiring heat resistance, such as interior materials for automobiles, an ABS resin containing maleimide-based copolymers is also used as a heat resistance imparting material (see, for example, Patent Documents 1 and 2).

The ABS resin containing the maleimide-based copolymers has a disadvantage in that it has poor chemical resistance. In order to solve the disadvantage, a copolymer obtained by copolymerizing vinyl cyanide monomers with the maleimide-based copolymers has been proposed (see, for example, Patent Documents 3 and 4). The maleimide-based copolymer obtained by copolymerizing with the vinyl cyanide monomers has a disadvantage in that it tends to have yellow hue, poor natural color appearance and poor colorability.

PRIOR ART DOCUMENTS

Patent Document 1: JPH57-098536A
Patent Document 2: JPH57-125242A
Patent Document 3: JP2004-339280A
Patent Document 4: JP2007-009228A

SUMMARY OF THE INVENTION

Problems to be Solved by the Invention

The present invention provides a maleimide-based copolymer capable of obtaining a resin composition having an excellent balance of hue, chemical resistance, heat resistance, impact resistance and fluidity, and a method for producing the same. The present invention also provides a resin composition having an excellent balance of physical properties such as the hue, chemical resistance, heat resistance, impact resistance and fluidity, obtained by mixing a maleimide-based copolymer with one or more resins selected from a ABS resin, an acrylonitrile-styrene-acrylate-based rubber copolymer resin (ASA resin), an acrylonitrile-ethylene propylene-based rubber-styrene copolymer resin (AES resin) and a styrene-acrylonitrile copolymer resin (SAN resin).

Means for Solving the Problems

That is, the present invention is summarized as follows.
(1) A maleimide-based copolymer including 40 to 60% by mass of an aromatic vinyl monomer units, 5 to 20% by mass of vinyl cyanide monomer units, and 35 to 50% by mass of maleimide-based monomer units, where a tetrahydrofuran solution containing 4% by mass of the copolymers has a transmittance of 90% or more for light having a wavelength of 450 nm at an optical path length of 10 mm, and an amount of the residual maleimide-based monomers is less than 300 ppm.
(2) The maleimide-based copolymer according to (1), further including 0 to 10% by mass of unsaturated dicarboxylic anhydride monomer units in the maleimide-based copolymer.
(3) The maleimide-based copolymer according to (1) or (2), having a glass transition temperature of 165° C. or higher.
(4) A method for producing the maleimide-based copolymer according to any one of (1) to (3), including an initial polymerization step, a middle polymerization step, a final polymerization step and an imidization step,
where in the an initial polymerization step, a total amount of vinyl cyanide monomers to be added, 10 to 90% by mass of a total amount of aromatic vinyl monomers to be added, and 0 to 30% by mass of a total amount of unsaturated dicarboxylic anhydride monomers to be added are mixed to start copolymerization,
in the middle polymerization step, 50 to 90% by mass of the remaining amount of the aromatic vinyl monomers used in the initial polymerization step and the remaining amount of the unsaturated dicarboxylic anhydride monomers used in the initial polymerization step are each separately or continuously added to the mixture to continue the copolymerization,
in the final polymerization step, the remaining amount of the aromatic vinyl monomers used in the initial polymerization step and the middle polymerization step is added to the mixture to obtain aromatic vinyl-vinyl cyanide-unsaturated dicarboxylic anhydride copolymers, and
in the imidization step, the obtained aromatic vinyl-vinyl cyanide-unsaturated dicarboxylic anhydride copolymers are imidized with ammonia or primary amine to obtain the maleimide-based copolymers.
(5) A resin composition including 5 to 40% by mass of the maleimide-based copolymers according to any one of (1) to (3), and 60 to 95% by mass of one or more resins selected from an ABS resin, an ASA resin, an AES resin and a SAN resin.
(6) An injection molded article using the resin composition according to (5).
(7) The injection molded article according to (6), used as an interior member or an exterior member of an automobile.

Effects of the Invention

The present invention provides the maleimide-based copolymer capable of obtaining the resin composition having the excellent balance of the hue, chemical resistance, heat resistance, impact resistance and fluidity, and the method for producing the same. The present invention also provides the resin composition having the excellent balance of the physical properties such as the hue, chemical resistance, heat resistance, impact resistance and fluidity, obtained by mixing the maleimide-based copolymers with one or more resins selected from the ABS resin, ASA resin, AES resin and SAN resin.

DETAILED DESCRIPTION OF THE INVENTION

Explanation of Terms

In the present application, the expression "A to B" means A or more and B or less.

The maleimide-based copolymer of the present invention can be obtained by copolymerizing aromatic vinyl monomers, vinyl cyanide monomers and maleimide monomers.

The aromatic vinyl monomer used for obtaining the maleimide-based copolymer is for improving hue of a resin composition obtained by mixing with the maleimide-based copolymers. The aromatic vinyl monomer includes styrene, o-methylstyrene, m-methylstyrene, p-methylstyrene, 2,4-dimethylstyrene, ethylstyrene, p-tert-butylstyrene, α-methylstyrene, and α-methyl-p-methylstyrene. Among them, the styrene is preferred because of its higher effect of improving the hue. Only one type of the styrene-based monomers may be used, or two or more types of the styrene-based monomers may be used in combination.

An amount of aromatic vinyl monomer units contained in the maleimide-based copolymer is 40 to 60% by mass, preferably 45 to 55% by mass. If the amount of the aromatic vinyl monomer units is less than 40% by mass, the resin composition has a yellow hue, and if it is more than 60% by mass, the heat resistance of the resin composition decreases.

The vinyl cyanide monomer used for obtaining the maleimide-based copolymers is for improving chemical resistance of the resin composition. The vinyl cyanide monomer includes acrylonitrile, methacrylonitrile, ethacrylonitrile, fumaronitrile. Among them, the acrylonitrile is preferred because of its higher effect of improving the chemical resistance. Only one type of the acrylonitrile-based monomers may be used, or two or more types of the acrylonitrile-based monomers may be used in combination.

An amount of vinyl cyanide monomer units contained in the maleimide-based copolymer is from 5 to 20% by mass, preferably from 7 to 15% by mass. If the amount of the vinyl cyanide monomer units is less than 5% by mass, the effect of improving the chemical resistance of the resin composition cannot be exhibited, and if it is more than 20% by mass, the resin composition has a yellow hue.

The maleimide monomer used for obtaining the maleimide-based copolymers is used for improving the heat resistance of the resin composition. The maleimide monomer includes N-alkylmaleimide such as N-methylmaleimide, N-butylmaleimide and N-cyclohexylmaleimide, N-phenylmaleimide, N-chlorophenylmaleimide, N-methylphenylmaleimide, N-methoxyphenylmaleimide, and N-tribromophenylmaleimide. Among them, the N-phenylmaleimide is preferable because of its higher effect of improving the heat resistance. Only one type of the maleimide monomers may be used, two or more type of maleimide monomers may be used in combination.

An amount of maleimide monomer units contained in the maleimide-based copolymer is 35 to 50% by mass, preferably 37 to 45% by mass. If the amount of the maleimide monomer units is less than 35% by mass, the effect of improving the heat resistance of the resin composition cannot be exhibited, and if it is more than 50% by mass, the impact strength of the resin composition decreases. The content of each monomer unit contained in the maleimide-based copolymer is a value measured by C-13 NMR method under the following measurement conditions.

Apparatus name: FT-NMR AVANCE300 (manufactured by BRUKER)

| | |
|---|---|
| Solvent: | Deuterated chloroform |
| Concentration: | 14% by mass |
| Temperature: | 25° C. |
| Number of scans: | 10000 times |

A tetrahydrofuran solution containing 4% by mass of the copolymer has a transmittance of 90% or more for light having a wavelength of 450 nm at an optical path length of 10 mm. If the transmittance is less than 90%, the hue of the resin composition obtained by mixing with one or more resins selected from the ABS resin, ASA resin, AES resin and SAN resin deteriorates. The transmittance is preferably 92% or more. The transmittance is a value obtained by measuring a solution adjusted to 4% by mass of the maleimide-based copolymer in the tetrahydrofuran in the quartz square cell having a measurement optical path length of 10 mm, using a spectrophotometer V-670ST (manufactured by JASCO Corporation).

The amount of the residual maleimide-based monomers contained in the maleimide-based copolymer is less than 300 ppm, preferably less than 200 ppm. If the amount of the residual maleimide-based monomers is 300 ppm or more, the obtained maleimide-based copolymer has a yellow hue. The amount of the residual maleimide-based monomers is a value measured under the following conditions.

Apparatus name: Gas Chromatograph GC-2010 (manufactured by Shimadzu Corporation)

| | |
|---|---|
| Column: | Capillary column DB-5ms (manufactured by Agilent Technology Co., Ltd.) |
| Temperature: | Inlet temperature of 280° C., detector temperature of 280° C. Perform a temperature rise analysis at a column temperature of 80° C. (initial). |
| (Temperature rising analysis conditions) | 80° C.: constant for 12 minutes 80-280° C.: 10 min at 20° C./min 280° C.: constant for 10 minutes |
| Detector: | FID |

Procedure: 0.5 g of a sample is dissolved in 5 ml of a 1,2-dichloroethane solution (0.014 g/L) containing undecane (internal standard). Thereafter, 5 ml of n-hexane is added and shaken for 10 to 15 minutes with a shaker to precipitate polymers. With the polymers precipitated, only the supernatant is injected into the gas chromatograph. A quantitative value is calculated from the peak area of the obtained maleimide-based monomers using a coefficient obtained from an internal standard substance.

The maleimide-based copolymer may be copolymerized with a copolymerizable monomer other than the aromatic vinyl monomer, vinyl cyanide monomer and maleimide monomer as long as the effects of the present invention are not impaired. The monomer copolymerizable with the maleimide-based copolymer includes an unsaturated dicarboxylic anhydride monomer such as maleic anhydride, itaconic anhydride, citraconic anhydride and aconitic anhydride; an acrylate monomer such as methyl acrylate, ethyl acrylate and butyl acrylate; a methacrylate monomer such as methyl methacrylate and ethyl methacrylate; a vinyl carboxylic monomer such as acrylic acid and methacrylic acid; acrylic amide; and methacrylic amide. Only one type of the monomers copolymerizable with the maleimide-based copolymer may be used, or two or more types of the monomers copolymerizable with the maleimide-based copolymer may be used in combination.

The unsaturated dicarboxylic anhydride monomer is preferable as the monomer copolymerizable with the maleimide-based copolymer. If the content of the unsaturated dicarboxylic acid units is 0.5% by mass or more, the unsaturated dicarboxylic acid unit is preferable because it reacts with resins having an amino group or alcohol group terminal to exhibit an effect as a compatibilizer. If the content of the unsaturated dicarboxylic anhydride monomer units is 10% by mass or less, it is preferable because the thermal stability is excellent. If the content of the unsaturated dicarboxylic anhydride monomer unit is 5% by mass or less, it is more preferable because the thermal stability is more excellent.

The glass transition temperature of the maleimide-based copolymer is preferably 165° C. to 200° C., more preferably 170° C. to 200° C., in order to efficiently improve the heat resistance of the resin to be mixed such the ABS resin and ASA resin. The glass transition temperature refers to an extrapolated glass transition initiation temperature (Tig) of the maleimide-based copolymer measured by the following apparatus and measurement conditions in accordance with JIS K-7121.

Apparatus name: Differential scanning calorimeter Robot DSC6200 (manufactured by Seiko Instruments Inc.)
Temperature rising rate: 10° C./min In order to increase the glass transition temperature of the maleimide-based copolymer, the content of the maleimide monomer units may be increased, or it may be copolymerized with a monomer having a higher glass transition temperature.

Examples of the polymerization mode of the maleimide-based copolymer include solution polymerization and bulk polymerization. The solution polymerization is preferred from the viewpoint that a maleimide-based copolymer having a uniform copolymer composition can be obtained by performing polymerization while separately or continuously adding monomers to be copolymerized. The solvent for the solution polymerization is preferably non-polymerizable from the viewpoint that by-products are unlikely to be formed and the adverse effects are small. The solvent includes ketone such as acetone, methyl ethyl ketone, methyl isobutyl ketone and acetophenone; ether such as tetrahydrofuran and 1,4-dioxane; aromatic hydrocarbon such as benzene, toluene, xylene and chlorobenzene; N,N-dimethylformamide; dimethylsulfoxide; N-methyl pyrrolidone. Methyl ethyl ketone and methyl isobutyl ketone are preferred from the viewpoint that the solvent can be easily removed during devolatilization and recovery of the maleimide-based copolymers. Any of a continuous polymerization system, a batch system (batch system), and a semi-batch system can be applied to the polymerization process.

A method for polymerizing the maleimide-based copolymer is preferably a method for obtaining the copolymer by radical polymerization, where the polymerization temperature is preferably in the range of 80 to 150° C., but not particularly limited thereto. A polymerization initiator to be used can include a well-known azo compound such as azobisisobutyronitrile, azobiscyclohexanecarbonitrile, azobismethylpropionitrile and azobismethylbutyronitrile; and a well-known organic peroxide such as 2,4-diphenyl-4-methyl-1-pentene, benzoyl peroxide, t-butylperoxybenzoate, 1,1-bis(t-butylperoxy)-3,3,5-trimethylcyclohexane, t-butylperoxyisopropyl monocarbonate, t-butylperoxy-2-ethylhexanoate, di-t-butyl peroxide, dicumyl peroxide, ethyl-3,3-di-(t-butylperoxy) butyrate, but not particularly limited thereto. Only one type of the initiators may be used, or two or more types of the initiators may be used in combination. From the viewpoint of controlling reaction rate of the polymerization and polymerization rate, it is preferable to use the azo compound or the organic peroxide having a 10-hour half-life at 70 to 120° C. The amount of the polymerization initiators to be used is preferably 0.1 to 1.5 parts by mass, more preferably 0.1 to 1.0 part by mass, based on 100 parts by mass of all the monomers used for the polymerization, but not particularly limited thereto. It is preferable that the amount of the polymerization initiators to be used is 0.1 part by mass or more, because the polymerization rate becomes sufficient. When the amount of the polymerization initiators to be used is 1.5 parts by mass or less, the polymerization rate can be suppressed, so that the reaction can be easily controlled, and the target molecular weight can be easily obtained.

A chain transfer agent can be used for producing the maleimide-based copolymer. Examples of the chain transfer agents to be used include n-octyl mercaptan, n-dodecyl mercaptan, t-dodecyl mercaptan, α-methylstyrene dimer, ethyl thioglycolate, limonene, terpinolene, but not particularly limited thereto. The amount of the chain transfer agents to be used is preferably 0.01 to 0.8 parts by mass, more preferably 0.1 to 0.5 parts by mass, based on 100 parts by mass of all monomers used for the polymerization, as long as the target molecular weight can be obtained, but not particularly limited thereto. When the amount of the chain transfer agents to be used is 0.01 to 0.8 parts by mass, the target molecular weight can be easily obtained.

The maleimide-based copolymer of the present invention may be obtained by copolymerizing the above-mentioned aromatic vinyl monomers, vinyl cyanide monomers and unsaturated dicarboxylic anhydride monomers, and then imidizing the unsaturated dicarboxylic anhydride monomer units in the copolymer with ammonia or primary amine to convert them into the maleimide monomer units (a post-imidization method). It is preferable to obtain the maleimide-based copolymer by the post-imidization method because the amount of the residual maleimide-based monomers in the copolymer is reduced.

The primary amine includes: alkylamine such as methylamine, ethylamine, n-propylamine, iso-propylamine, n-butylamine, n-pentylamine, n-hexylamine, n-octylamine, cyclohexylamine and decylamine; and aromatic amine such as chlor- or bromo-substituted alkylamine, aniline, toluidine naphthylamine, among which the aniline and the cyclohexylamine are preferred. Only one type of the primary amines may be used, or two or more types of the primary amines may be used in combination. The amount of the primary amines to be added is preferably 0.7 to 1.1 molar equivalents, more preferably 0.85 to 1.05 molar equivalents, based on the unsaturated dicarboxylic anhydride monomer unit, but not particularly limited thereto. It is preferable that the amount of the primary amines to be added is 0.7 molar equivalent or more based on the unsaturated dicarboxylic acid anhydride monomer unit in the maleimide-based copolymer, because the thermal stability of the obtained resin composition is improved. It is also preferable that the amount of the primary amines to be added is 1.1 molar equivalent or less, because the remaining amount of the primary amines in the maleimide-based copolymer is reduced.

When the maleimide-based copolymer is obtained by the post-imidization method, a catalyst for improving a dehydration ring closure reaction can be used in the reaction of the ammonia or the primary amine with the unsaturated dicarboxylic anhydride monomer unit, in particular, the reaction to convert the unsaturated dicarboxylic anhydride monomer unit to the maleimide monomer unit, as needed. The catalyst includes tertiary amine such as trimethylamine, triethylamine, tripropylamine, tributylamine, N, N-dimethylaniline, and N, N-diethylaniline, but not particularly limited thereto. The amount of the tertiary amines to be added is preferably 0.01 mole equivalent or more based on the unsaturated dicarboxylic anhydride monomer unit, but not particularly limited thereto. The temperature of the imidization reaction in the present invention is preferably 100 to 250° C., more preferably 120 to 200° C. From the viewpoint of productivity, it is preferable that the temperature of the imidation reaction is 100° C. or higher because the reaction rate become sufficiently high. It is preferable that the temperature of the imidization reaction is 250° C. or lower, because a decrease in physical properties due to the thermal deterioration of the maleimide-based copolymer can be suppressed.

In the post-imidization method for obtaining the maleimide-based copolymer, it is also possible to carry out the polymerization in the initial stage of the polymerization, using the total amount of the aromatic vinyl monomers, vinyl cyanide monomers and unsaturated dicarboxylic anhydride monomers to be added. However, the aromatic vinyl monomer and unsaturated dicarboxylic anhydride monomer have a strong tendency to copolymerize with each other. Therefore, the aromatic vinyl monomer and the unsaturated dicarboxylic anhydride monomer are consumed in the early stage of the polymerization, and a copolymer having a large amount of the vinyl cyanide monomer units may be easily generated in the late stage of the polymerization. As a result, the hue of the obtained maleimide-based copolymer may deteriorate and/or the physical property of the obtained resin composition may be unfavorable due to the wide distribution of the composition and the lack of the compatibility at the time of mixing with the ABS resin or the like. Therefore, in order to obtain a (uniform) maleimide-based copolymer having a favorable hue and a narrow composition distribution, it is preferable to use a production method having the following steps.

Initial polymerization step: A total amount of the vinyl cyanide monomers to be added, 10 to 90% by mass of a total amount of the aromatic vinyl monomers to be added, and 0 to 30% by mass of a total amount of the unsaturated dicarboxylic anhydride monomers to be added are mixed to start copolymerization.

Middle polymerization step: 50 to 90% by mass of the remaining amount of the aromatic vinyl-based monomers used in the initial polymerization step, and the remaining amount of the unsaturated dicarboxylic anhydride monomers used in the initial polymerization step are each separately or continuously added to the mixture to continue the copolymerization.

Final polymerization step: The remaining amount of the aromatic vinyl monomers used in the initial polymerization step and the middle polymerization step is added to the mixture to obtain an aromatic vinyl-vinyl cyanide-unsaturated dicarboxylic anhydride copolymers.

Imidation step: The obtained aromatic vinyl-vinyl cyanide-unsaturated dicarboxylic anhydride copolymer is imidized with ammonia or primary amine to obtain the maleimide-based copolymers.

As a means (devolatilization means) for removing volatile components such as a solvent used for solution polymerization and unreacted monomers from a solution after the solution polymerization of the maleimide-based copolymer or after the post-imidization, a well-known means such as a vacuum devolatilization tank with a heater and a devolatilization extruder with a vent can be used. In a granulation step, the devolatilized maleimide-based copolymers in molten state can be extruded into a strand-shaped copolymer from a porous die and then be processed into pellet shapes by a cold cut method, an air hot cut method, or an underwater hot cut method.

The obtained maleimide-based copolymers can be used as a heat resistance imparting agent for a resin composition obtained by mixing with various resins. The resin includes the ABS resin, ASA resin, AES resin, and SAN resin, but not particularly limited thereto. Since these resins have an excellent compatibility with the maleimide-based copolymer, a high heat-resistance can be imparted to the obtained resin composition. The blending ratio of the maleimide-based copolymer and the resin is preferably 5 to 40% by mass of the maleimide-based copolymer and 60 to 95% by mass of one or more selected from the group consisting of the ABS resin, ASA resin, AES resin and SAN resin, more preferably 10 to 30% by mass of the maleimide-based copolymer and 70 to 90% by mass of one or more resins selected from the group consisting of the ABS resin, ASA resin, AES resin and SAN resin.

When the blending ratio of the maleimide-based copolymer is in this range, the effect of improving the heat resistance of the resin composition is obtained, and the chemical resistance and hue of the resin composition are not reduced.

As a technique for mixing the maleimide-based copolymer with one or more resins, a well-known melt-mixing technique can be used, but not particularly limited thereto. A suitable melt-mixing apparatus include: a screw extruder such as a single-screw extruder, a fully meshing co-rotating twin-screw extruder, a fully meshing different-direction twin-screw extruder, and a non- or incompletely meshing twin-screw extruder; a ban bury mixer; a co-kneader; and mixing roll.

In the mixing of the maleimide-based copolymer with one or more resins, a stabilizer, an ultraviolet absorber, a flame retardant, a plasticizer, a lubricant, a glass fiber, an inorganic filler, a coloring agent, an antistatic agent, and the like can be further added.

In order to obtain a molded article from the resin composition, well-known molding techniques such as an injection molding, an extrusion molding, a sheet molding and a press molding can be used. The resin composition of the present invention is particularly excellent in the heat resistance and can be particularly used suitably as a material for injection molding which is subjected to high temperature and high pressure during the molding.

The molded article obtained by molding the resin composition can be suitably used for an interior member or an exterior member of an automobile.

EXAMPLES

Hereinafter, detailed contents will be described using examples, but the present invention is not limited to the following examples.

<Production Example of Maleimide-Based Copolymer (A-1)>

22 parts by mass of styrene, 13 parts by mass of acrylonitrile, 4 parts by mass of maleic anhydride, 0.1 part by mass of 2,4-diphenyl-4-methyl-1-pentene, 12 parts by mass of methyl ethyl ketone were added into about 120-liter autoclave equipped with a stirrer, and then heated to 92° C. over 40 minutes while stirring after replacing a gas phase in the autoclave with nitrogen gas. While maintaining the temperature at 92° C. after the temperature rise, 28 parts by mass of styrene and a solution prepared by dissolving 25 parts by mass of maleic anhydride and 0.22 parts by mass of t-butylperoxy-2-ethylhexanoate in 75 parts by mass of methyl ethyl ketone were continuously added over 7 hours. After completion of the addition of the maleic anhydride, 8 parts by mass of the styrene was continuously added over 2 hours. After the addition of the styrene, the temperature was raised to 120° C. The reaction was carried out for 1 hour. After completion of the reaction, the polymerization was completed. Thereafter, 26 parts by mass of aniline and 0.5 parts by mass of triethylamine were added to the polymerization solution. After the addition, the reaction was carried out at 140° C. for 7 hours. After completion of the reaction, the imidization reaction solution was added into a vent-type screw extruder. Volatile components were removed to obtain a maleimide-based copolymer A-1 in a pellet form. Table 1 shows the analysis results of the obtained maleimide-based copolymer A-1.

<Production Example of Maleimide-Based Copolymer (A-2)>

20 parts by mass of styrene, 8 parts by mass of acrylonitrile, 4 parts by mass of N-phenylmaleimide, 0.1 part by mass of 2,4-diphenyl-4-methyl-1-pentene, 16 parts by mass of methyl ethyl ketone were added into about 120-liter autoclave equipped with a stirrer, and then heated to 92° C. over 40 minutes while stirring after replacing a gas phase in the autoclave with nitrogen gas. While maintaining the temperature at 92° C. after the temperature rise, 23 parts by mass of styrene and a solution prepared by dissolving 38 parts by mass of N-phenylmaleimide and 0.2 parts by mass of t-butylperoxy-2-ethylhexanoate in 152 parts by mass of methyl ethyl ketone were continuously added over 7 hours. After completion of the addition of the N-phenylmaleimide, 7 parts by mass of the styrene was continuously added over 2 hours. After the addition of the styrene, the temperature was raised to 120° C. The reaction was carried out for 1 hour. After completion of the reaction, the polymerization was completed. After completion of the reaction, the polymerization solution was added into the vent-type screw extruder. Volatile components were removed to obtain a maleimide-based copolymer A-2 in a pellet form. Table 1 shows the analysis results of the obtained maleimide-based copolymer A-2.

<Production Example of Maleimide-Based Copolymer (A-3)>

17 parts by mass of styrene, 22 parts by mass of acrylonitrile, 5 parts by mass of maleic anhydride, 0.1 part by mass of 2,4-diphenyl-4-methyl-1-pentene, 20 parts by mass of methyl ethyl ketone were added into about 120-liter autoclave equipped with a stirrer, and then heated to 92° C. over 40 minutes while stirring after replacing a gas phase in the autoclave with nitrogen gas. While maintaining the temperature at 92° C. after the temperature rise, 28 parts by mass of styrene and a solution prepared by dissolving 20 parts by mass of maleic anhydride and 0.25 parts by mass of t-butylperoxy-2-ethylhexanoate in 80 parts by mass of methyl ethyl ketone were continuously added over 7 hours. After completion of the addition of the maleic anhydride, 8 parts by mass of the styrene was continuously added over 2 hours. After the addition of the styrene, the temperature was raised to 120° C. The reaction was carried out for 1 hour. After completion of the reaction, the polymerization was completed. Thereafter, 22 parts by mass of aniline and 0.4 parts by mass of triethylamine were added to the polymerization solution. After the addition, the reaction was carried out at 140° C. for 7 hours. After completion of the reaction, the imidization reaction solution was added into a vent-type screw extruder. Volatile components were removed to obtain a maleimide-based copolymer A-3 in a pellet form. Table 1 shows the analysis results of the obtained maleimide-based copolymer A-3.

<Production Example of Maleimide-Based Copolymer (A-4)>

13 parts by mass of styrene, 11 parts by mass of acrylonitrile, 6 parts by mass of maleic anhydride, 0.1 part by mass of 2,4-diphenyl-4-methyl-1-pentene, 18 parts by mass of methyl ethyl ketone were added into about 120-liter autoclave equipped with a stirrer, and then heated to 92° C. over 40 minutes while stirring after replacing a gas phase in the autoclave with nitrogen gas. While maintaining the temperature at 92° C. after the temperature rise, 31 parts by mass of styrene and a solution prepared by dissolving 30 parts by mass of maleic anhydride and 0.2 parts by mass of t-butylperoxy-2-ethylhexanoate in 90 parts by mass of methyl ethyl ketone were continuously added over 7 hours. After completion of the addition of the maleic anhydride, 9 parts by mass of the styrene was continuously added over 2 hours. After the addition of the styrene, the temperature was raised to 120° C. The reaction was carried out for 1 hour. After completion of the reaction, the polymerization was completed. Thereafter, 32 parts by mass of aniline and 0.6 parts by mass of triethylamine were added to the polymerization solution. After the addition, the reaction was carried out at 140° C. for 7 hours. After completion of the reaction, the imidization reaction solution was added into a vent-type screw extruder. Volatile components were removed to obtain a maleimide-based copolymer A-4 in a pellet form. Table 1 shows the analysis results of the obtained maleimide-based copolymer A-4.

<Production Example of Maleimide-Based Copolymer (A-5)>

45 parts by mass of styrene, 8 parts by mass of acrylonitrile, 0.1 part by mass of 2,4-diphenyl-4-methyl-1-pentene, 16 parts by mass of methyl ethyl ketone were added into about 120-liter autoclave equipped with a stirrer, and then heated to 92° C. over 40 minutes while stirring after replacing a gas phase in the autoclave with nitrogen gas. While maintaining the temperature at 92° C. after the temperature rise, 18 parts by mass of styrene and a solution prepared by dissolving 24 parts by mass of maleic anhydride and 0.3 parts by mass of t-butylperoxy-2-ethylhexanoate in 96 parts by mass of methyl ethyl ketone were continuously added over 7 hours. After completion of the addition of the maleic anhydride, 5 parts by mass of the styrene was continuously added over 2 hours. After the addition of the styrene, the temperature was raised to 120° C. The reaction was carried out for 1 hour. After completion of the reaction, the polymerization was completed. Thereafter, 21 parts by mass of aniline and 0.4 parts by mass of triethylamine were added to the polymerization solution. After the addition, the reaction was carried out at 140° C. for 7 hours. After completion of the reaction, the imidization reaction solution was added into a vent-type screw extruder. Volatile components were removed to obtain a maleimide-based copolymer A-5 in a pellet form. Table 1 shows the analysis results of the obtained maleimide-based copolymer A-5.

<Production Example of Maleimide-Based Copolymer (A-6)>

22 parts by mass of styrene, 13 parts by mass of acrylonitrile, 4 parts by mass of maleic anhydride, 0.1 part by mass of 2,4-diphenyl-4-methyl-1-pentene, 12 parts by mass of methyl ethyl ketone were added into about 120-liter autoclave equipped with a stirrer, and then heated to 92° C. over 40 minutes while stirring after replacing a gas phase in the autoclave with nitrogen gas. While maintaining the temperature at 92° C. after the temperature rise, 32 parts by mass of styrene and a solution prepared by dissolving 25 parts by mass of maleic anhydride and 0.22 parts by mass of t-butylperoxy-2-ethylhexanoate in 75 parts by mass of methyl ethyl ketone were continuously added over 8 hours. After completion of the addition of the maleic anhydride, 4 parts by mass of the styrene was continuously added over 1 hour. After the addition of the styrene, the temperature was raised to 120° C. The reaction was carried out for 1 hour. After completion of the reaction, the polymerization was completed. Thereafter, 26 parts by mass of aniline and 0.5 parts by mass of triethylamine were added to the polymerization solution. After the addition, the reaction was carried out at 140° C. for 7 hours. After completion of the reaction, the imidization reaction solution was added into a vent-type screw extruder. Volatile components were removed to obtain a maleimide-based copolymer A-6 in a pellet form. Table 1 shows the analysis results of the obtained maleimide-based copolymer A-6.

<Production Example of Maleimide-Based Copolymer (A-7)>

59.7 parts by mass of styrene, 3.8 parts by mass of acrylonitrile, 0.05 part by mass of 2,4-diphenyl-4-methyl-1-pentene, 18 parts by mass of methyl isobutyl ketone were added into about 120-liter autoclave equipped with a stirrer, and then heated to 90° C. over 40 minutes while stirring after replacing a gas phase in the autoclave with nitrogen gas. While maintaining the temperature at 90° C. after the temperature rise, a solution prepared by dissolving 36.5 parts by mass of maleic anhydride and 0.1 part by mass of t-butylperoxy-2-ethylhexanoate in 120 parts by mass of methyl isobutyl ketone were continuously added over 4 hours. After completion of the addition of the maleic anhydride, the temperature was raised to 110° C. The reaction was carried out for 2 hours. After completion of the reaction, the polymerization was completed. Thereafter, 32.7 parts by mass of aniline and 0.5 parts by mass of triethylamine were added to the polymerization solution. After the addition, the reaction was carried out at 155° C. for 4 hours. After completion of the reaction, the imidization reaction solution was added into a vent-type screw extruder. Volatile components were removed to obtain a maleimide-based copolymer A-7 in a pellet form. Table 2 shows the analysis results of the obtained maleimide-based copolymer A-7.

<Production Example of Maleimide-Based Copolymer (A-8)>

25.1 parts by mass of styrene, 14.9 parts by mass of acrylonitrile, 0.05 part by mass of 2,4-diphenyl-4-methyl-1-pentene, 18 parts by mass of methyl isobutyl ketone were added into about 120-liter autoclave equipped with a stirrer, and then heated to 90° C. over 40 minutes while stirring after replacing a gas phase in the autoclave with nitrogen gas. While maintaining the temperature at 90° C. after the temperature rise, 25 parts by mass of styrene and a solution prepared by dissolving 35 parts by mass of maleic anhydride and 0.1 part by mass of t-butylperoxy-2-ethylhexanoate in 120 parts by mass of methyl isobutyl ketone were continuously added over 4 hours. After completion of the addition of the maleic anhydride, the temperature was raised to 110° C. The reaction was carried out for 2 hours. After completion of the reaction, the polymerization was completed. Thereafter, 31.9 parts by mass of aniline and 0.5 parts by mass of triethylamine were added to the polymerization solution. After the addition, the reaction was carried out at 155° C. for 4 hours. After completion of the reaction, the imidization reaction solution was added into a vent-type screw extruder. Volatile components were removed to obtain a maleimide-based copolymer A-8 in a pellet form. Table 2 shows the analysis results of the obtained maleimide-based copolymer A-8.

<Production Example of Maleimide-Based Copolymer (A-9)>

65 parts by mass of styrene, 8 parts by mass of acrylonitrile, 2 parts by mass of maleic anhydride, 0.1 part by mass of 2,4-diphenyl-4-methyl-1-pentene, 10 parts by mass of methyl ethyl ketone were added into about 120-liter autoclave equipped with a stirrer, and then heated to 92° C. over 40 minutes while stirring after replacing a gas phase in the autoclave with nitrogen gas. While maintaining the temperature at 92° C. after the temperature rise, 7 parts by mass of styrene and a solution prepared by dissolving 16 parts by mass of maleic anhydride and 0.3 parts by mass of t-butylperoxy-2-ethylhexanoate in 80 parts by mass of methyl ethyl ketone were continuously added over 7 hours. After completion of the addition of the maleic anhydride, 2 parts by mass of the styrene was continuously added over 2 hours. After the addition of the styrene, the temperature was raised to 120° C. The reaction was carried out for 1 hour. After completion of the reaction, the polymerization was completed. Thereafter, 16 parts by mass of aniline and 0.3 parts by mass of triethylamine were added to the polymerization solution. After the addition, the reaction was carried out at 140° C. for 7 hours. After completion of the reaction, the imidization reaction solution was added into a vent-type screw extruder. Volatile components were removed to obtain a maleimide-based copolymer A-9 in a pellet form. Table 2 shows the analysis results of the obtained maleimide-based copolymer A-9.

<Production Example of Maleimide-Based Copolymer (A-10)>

14 parts by mass of styrene, 28 parts by mass of acrylonitrile, 3 parts by mass of maleic anhydride, 0.1 part by mass of 2,4-diphenyl-4-methyl-1-pentene, 12 parts by mass of methyl ethyl ketone were added into about 120-liter autoclave equipped with a stirrer, and then heated to 92° C. over 40 minutes while stirring after replacing a gas phase in the autoclave with nitrogen gas. While maintaining the temperature at 92° C. after the temperature rise, 25 parts by mass of styrene and a solution prepared by dissolving 23 parts by mass of maleic anhydride and 0.4 parts by mass of t-butylperoxy-2-ethylhexanoate in 92 parts by mass of methyl ethyl ketone were continuously added over 7 hours. After completion of the addition of the maleic anhydride, 7 parts by mass of the styrene was continuously added over 2 hours. After the addition of the styrene, the temperature was raised to 120° C. The reaction was carried out for 1 hour. After completion of the reaction, the polymerization was completed. Thereafter, 23 parts by mass of aniline and 0.4 parts by mass of triethylamine were added to the polymerization solution. After the addition, the reaction was carried out at 140° C. for 7 hours. After completion of the reaction, the imidization reaction solution was added into a vent-type screw extruder. Volatile components were removed to obtain a maleimide-based copolymer A-10 in a pellet form. Table 2 shows the analysis results of the obtained maleimide-based copolymer A-10.

<Production Example of Maleimide-Based Copolymer (A-11)>

2 parts by mass of styrene, 10 parts by mass of acrylonitrile, 5 parts by mass of maleic anhydride, 0.1 part by mass of 2,4-diphenyl-4-methyl-1-pentene, 15 parts by mass of methyl ethyl ketone were added into about 120-liter autoclave equipped with a stirrer, and then heated to 92° C. over 40 minutes while stirring after replacing a gas phase in the autoclave with nitrogen gas. While maintaining the temperature at 92° C. after the temperature rise, 35 parts by mass of styrene and a solution prepared by dissolving 38 parts by mass of maleic anhydride and 0.4 parts by mass of t-butylperoxy-2-ethylhexanoate in 114 parts by mass of methyl ethyl ketone were continuously added over 7 hours. After completion of the addition of the maleic anhydride, 10 parts by mass of the styrene was continuously added over 2 hours. After the addition of the styrene, the temperature was raised to 120° C. The reaction was carried out for 1 hour. After completion of the reaction, the polymerization was completed. Thereafter, 38 parts by mass of aniline and 0.7 parts by mass of triethylamine were added to the polymerization solution. After the addition, the reaction was carried out at 140° C. for 7 hours. After completion of the reaction, the imidization reaction solution was added into a vent-type screw extruder. Volatile components were removed to obtain a maleimide-based copolymer A-11 in a pellet form. Table 2 shows the analysis results of the obtained maleimide-based copolymer A-11.

<Production Example of Maleimide-Based Copolymer (A-12)>

65 parts by mass of styrene, 7 parts by mass of maleic anhydride, 0.2 parts by mass of 2,4-diphenyl-4-methyl-1-pentene, 25 parts by mass of methyl ethyl ketone were added into about 120-liter autoclave equipped with a stirrer, and then heated to 92° C. after replacing a gas phase in the autoclave with nitrogen gas. A solution prepared by dissolving 28 parts by mass of maleic anhydride and 0.18 parts by mass of t-butylperoxy-2-ethylhexanoate in 100 parts by mass of methyl ethyl ketone were continuously added over 7 hours. After the addition, 0.03 parts by mass of the t-butylperoxy-2-ethylhexanoate was further added. After the addition of t-butylperoxy-2-ethylhexanoate, the temperature was raised to 120° C. The reaction was carried out for 1 hour. After completion of the reaction, the polymerization was completed. Thereafter, 32 parts by mass of aniline and 0.6 parts by mass of triethylamine were added to the polymerization solution. After the addition, the reaction was carried out at 140° C. for 7 hours. After completion of the reaction, the imidization reaction solution was added into a vent-type screw extruder. Volatile components were removed to obtain a maleimide-based copolymer A-12 in a pellet form. Table 2 shows the analysis results of the obtained maleimide-based copolymer A-12.

<Production Example of Maleimide-Based Copolymer (A-13)>

40 parts by mass of styrene, 16 parts by mass of acrylonitrile, 5 parts by mass of maleic anhydride, 0.2 parts by mass of 2,4-diphenyl-4-methyl-1-pentene, 20 parts by mass of methyl ethyl ketone were added into about 120-liter autoclave equipped with a stirrer, and then heated to 92° C. after replacing a gas phase in the autoclave with nitrogen gas. 18 parts by mass of styrene and a solution prepared by dissolving 16 parts by mass of maleic anhydride and 0.3 parts by mass of t-butylperoxy-2-ethylhexanoate in 80 parts by mass of methyl ethyl ketone were continuously added over 7 hours. After completion of the addition of the maleic anhydride, 5 parts by mass of the styrene was continuously added over 2 hours. After the addition of the styrene, the temperature was raised to 120° C. The reaction was carried out for 1 hour. After completion of the reaction, the polymerization was completed. Thereafter, 19 parts by mass of aniline and 0.4 parts by mass of triethylamine were added to the polymerization solution. After the addition, the reaction was carried out at 140° C. for 7 hours. After completion of the reaction, the imidization reaction solution was added into a vent-type screw extruder. Volatile components were removed to obtain a maleimide-based copolymer A-13 in a pellet form. Table 2 shows the analysis results of the obtained maleimide-based copolymer A-13.

TABLE 1

|  |  |  | Exam. 1 A-1 | Exam. 2 A-2 | Exam. 3 A-3 | Exam. 4 A-4 | Exam. 5 A-5 | Exam. 6 A-6 |
|---|---|---|---|---|---|---|---|---|
| Structure unit | Aromatic vinyl monomer unit | % by mass | 47.2 | 51.0 | 45.2 | 42.0 | 56.3 | 47.3 |
|  | Vinyl cyanide monomer unit | % by mass | 10.2 | 8.0 | 17.5 | 7.9 | 6.5 | 10.3 |
|  | Maleimide monomer unit | % by mass | 41.2 | 41.0 | 36.0 | 48.6 | 35.9 | 41.0 |
|  | Unsaturated dicarboxylic anhydride monomer unit | % by mass | 1.4 | — | 1.3 | 1.5 | 1.3 | 1.4 |
| Transmittance at 450 nm |  | % | 93 | 93 | 91 | 90 | 94 | 91 |
| Glass transition temperature |  | ° C. | 175 | 173 | 167 | 195 | 165 | 175 |
| Amount of residual maleimide monomer |  | ppm | 150 | 180 | 120 | 260 | 120 | 250 |

TABLE 2

|  |  |  | Comp. Exam. 1 A-7 | Comp. Exam. 2 A-8 | Comp. Exam. 3 A-9 | Comp. Exam. 4 A-10 | Comp. Exam. 5 A-11 | Comp. Exam. 6 A-12 | Comp. Exam. 7 A-13 |
|---|---|---|---|---|---|---|---|---|---|
| Structure unit | Aromatic vinyl monomer unit | % by mass | 47.3 | 39.8 | 65.6 | 38.9 | 37.3 | 51.1 | 53.6 |
|  | Vinyl cyanide monomer unit | % by mass | 3.0 | 11.9 | 7.1 | 22.9 | 7.3 | — | 14.2 |
|  | Maleimide monomer unit | % by mass | 48.0 | 47.2 | 26.4 | 36.9 | 53.7 | 48.1 | 31.2 |
|  | Unsaturated dicarboxylic anhydride monomer unit | % by mass | 1.7 | 1.1 | 0.9 | 1.3 | 1.7 | 0.8 | 1.0 |
| Transmittance at 450 nm |  | % | 89 | 82 | 94 | 79 | 85 | 95 | 92 |
| Glass transition temperature |  | ° C. | 164 | 142 | 140 | 160 | 183 | 188 | 149 |
| Amount of residual maleimide monomer |  | ppm | 210 | 230 | 150 | 190 | 450 | 170 | 170 |

Composition Analysis

The maleimide-based copolymers were measured by C-13 NMR method under the following measurement conditions.

Apparatus name: FT-NMR AVANCE300 (manufactured by BRUKER)

| Solvent: | Deuterated chloroform |
| Concentration: | 14% by mass |
| Temperature: | 27° C. |
| Number of scans: | 8000 times |

Transmittance at 450 nm

Each maleimide-based copolymer was dissolved in tetrahydrofuran to prepare a tetrahydrofuran solution containing 4% by mass of the copolymer. After filling each solution into a quartz square cell with a measuring optical path length of 10 mm, the transmittance of each solution was measured using a spectrophotometer V-670ST (manufactured by JASCO Corporation).

Glass Transition Temperature

An extrapolated glass transition initiation temperature (Tig) of each maleimide-based copolymer was measured according to JIS K-7121 using the following apparatus and measuring conditions.

Apparatus name: Robot DSC6200 (manufactured by Seiko Instruments Inc.)
Heating rate: 10° C./min Amount of Residual Maleimide Monomer Procedure: 0.5 g of a sample is dissolved in 5 ml of a 1,2-dichloroethane solution (0.014 g/L) containing undecane (internal standard). Thereafter, 5 ml of n-hexane is added and shaken for 10 to 15 minutes with a shaker to precipitate polymers. With the polymer precipitated, only the supernatant is injected into the gas chromatograph. A quantitative value was calculated from the peak area of the obtained maleimide-based monomer using a coefficient obtained from an internal standard substance.

Apparatus name: Gas Chromatograph GC-2010 (manufactured by Shimadzu Corporation)

| Column: | Capillary column DB-5ms (manufactured by Agilent Technology Co., Ltd.) |
| Temperature: | Inlet temperature of 280° C., detector temperature of 280° C. Perform a temperature rise analysis at a column temperature of 80° C. (initial). |
| (Temperature rising analysis conditions) | 80° C.: constant for 12 minutes<br>80-280° C.: 10 min at 20° C./min<br>280° C.: constant for 10 minutes |
| Detector: | FID |

Resin Composition

Examples 7 to 14 (Exam. 7 to 14) and Comparative Examples 8 to 16 (Comp. Exam. 8 to 16) (Mixing of Maleimide-Based Copolymer and ABS Resin)

Each of the maleimide-based copolymers A-1 to A-13 was blended with a commercially available ABS resin GR-3000 (manufactured by Denka Corporation) at the blending ratio (% by mass) shown in Tables 3 and 4. After the blending, the mixture was extruded and pelletized using a twin screw extruder TEM-35B (manufactured by Toshiba Machine Co., Ltd.) under the conditions shown in Tables 3 and 4. Using the pellets, test pieces were prepared by an injection molding machine, and each physical property value was measured. The results are shown in Tables 3 and 4.

TABLE 3

|  |  | Exam. 7 | Exam. 8 | Exam. 9 | Exam. 10 | Exam. 11 | Exam. 12 | Exam. 13 | Exam. 14 |
|---|---|---|---|---|---|---|---|---|---|
| Blending ratio | Maleimide-based copolymer A-1 | 15 | 8 | 35 | — | — | — | — | — |
|  | Maleimide-based copolymer A-2 | — | — | — | 15 | — | — | — | — |
|  | Maleimide-based copolymer A-3 | — | — | — | — | 15 | — | — | — |
|  | Maleimide-based copolymer A-4 | — | — | — | — | — | 15 | — | — |
|  | Maleimide-based copolymer A-5 | — | — | — | — | — | — | 15 | — |
|  | Maleimide-based copolymer A-6 | — | — | — | — | — | — | — | 15 |
|  | ABS resin (GR-3000) | 85 | 92 | 65 | 85 | 85 | 85 | 85 | 85 |

TABLE 3-continued

|  |  | Exam. 7 | Exam. 8 | Exam. 9 | Exam. 10 | Exam. 11 | Exam. 12 | Exam. 13 | Exam. 14 |
|---|---|---|---|---|---|---|---|---|---|
| Charpy impact strength | kJ/m² | 24 | 28 | 18 | 25 | 26 | 21 | 25 | 25 |
| Melt mass flow rate | g/10 min | 8 | 16 | 3 | 6 | 10 | 5 | 13 | 7 |
| Vital softening point | °C. | 115 | 110 | 125 | 115 | 113 | 118 | 112 | 115 |
| Chemical resistance | — | Great | Great | Fair | Good | Great | Good | Fair | Great |
| YI | — | 30 | 28 | 38 | 30 | 34 | 36 | 29 | 35 |

TABLE 4

|  |  | Comp. Exam. 8 | Comp. Exam. 9 | Comp. Exam. 10 | Comp. Exam. 11 | Comp. Exam. 12 | Comp. Exam. 13 | Comp. Exam. 14 | Comp. Exam. 15 | Comp. Exam. 16 |
|---|---|---|---|---|---|---|---|---|---|---|
| Blending ratio | Maleimide-based copolymer A-1 | 3 | 50 | — | — | — | — | — | — | — |
|  | Maleimide-based copolymer A-7 | — | — | 15 | — | — | — | — | — | — |
|  | Maleimide-based copolymer A-8 | — | — | — | 15 | — | — | — | — | — |
|  | Maleimide-based copolymer A-9 | — | — | — | — | 15 | — | — | — | — |
|  | Maleimide-based copolymer A-10 | — | — | — | — | — | 15 | — | — | — |
|  | Maleimide-based copolymer A-11 | — | — | — | — | — | — | 15 | — | — |
|  | Maleimide-based copolymer A-12 | — | — | — | — | — | — | — | 15 | — |
|  | Maleimide-based copolymer A-13 | — | — | — | — | — | — | — | — | 15 |
|  | ABS resin (GR-3000) | 97 | 50 | 85 | 85 | 85 | 85 | 85 | 85 | 83 |
| Charpy impact strength | kJ/m² | 29 | 12 | 19 | 21 | 22 | 24 | 17 | 19 | 21 |
| Melt mass flow rate | g/10 min | 27 | 1 | 6 | 5 | 19 | 10 | 4 | 5 | 15 |
| Vicat softening point | °C. | 103 | 132 | 118 | 118 | 108 | 113 | 119 | 117 | 109 |
| Chemical resistance | — | Great | Poor | Poor | Good | Fair | Great | Fair | Poor | Good |
| YI | — | 26 | 45 | 41 | 48 | 29 | 55 | 45 | 28 | 35 |

Charpy Impact Strength

According to JIS K-7111, the Charpy impact strength was measured using a notched test piece under relative humidity of 50% and ambient temperature of 23° C. The impact direction was edgewise. The measuring device used was a digital impact tester (manufactured by Toyo Seiki Seisaku-sho, Ltd.). The case where the Charpy impact strength was 15 kJ/m² or more was judged to be good.

Melt Mass Flow Rate

According to JIS K7210, the melt mass flow rate was measured at 220° C. under a load of 98 N. The case where the melt mass flow rate was 3 g/10 minutes or more was judged to be good.

Vicat Softening Point

According to JIS K7206, the Vicat softening point was measured by a 50 method (load of 50 N, heating rate of 50° C./hour) using a test piece having a length of 10 mm, a width of 10 mm and a thickness of 4 mm. A measuring device used was an HDT & VSPT test device (manufactured by Toyo Seiki Seisaku-sho, Ltd.). The case where the Vicat softening point was 110° C. or higher was judged to be good.

Chemical Resistance

Cracks of a test piece having a shape of 316×20×2 mm were observed after 48 hours at 23° C. by a quarter ellipse method having a major radius of 250 mm and a minor radius of 150 mm. In order to eliminate influence of molding strain, the test piece was produced by pressing and cutting out a pellet at 260° C. Toluene is used as the chemical.

Critical strain was calculated by the following equation.

$$\varepsilon = b/2a^2 [1-(a^2-b^2)X^2/a^4]^{1.5} *t*100$$

Critical strain: ε, major radius: a, minor radius: b, thickness of test piece: t, crack initiation point: X The chemical resistance was evaluated from the critical strain according to the following criteria.

Great: 0.8 or more, Good: 0.6 to 0.7, Fair: 0.3 to 0.5, Poor: 0.2 or less

YI (Hue)

A plate (9 cm×5 cm) was molded at a molding temperature of 240° C. using an injection molding machine IS-50EP (manufactured by Toshiba Machine Co., Ltd.). The yellowness YI of the molded plate was measured by a color difference meter COLOR-7e² (manufactured by Kurashiki Spinning Co., Ltd.). The case where the yellowness YI was 40 or less was judged to be good.

The maleimide-based copolymers of Examples 1 to 6 (Exam. 1 to 6) of the present invention had a sufficiently high transmittance at 450 nm and a sufficiently high glass transition temperature. Therefore, the resin compositions of Examples 7 to 14 (Exam. 7 to 14) in which the maleimide-based copolymer and the ABS resin were mixed were excellent in the impact resistance, fluidity, heat resistance, chemical resistance, and hue. The matrix resin of the ABS resin is an AS resin. Thus, when the maleimide-based copolymer of the present invention is mixed with the AS resin or an AES resin or an ASA resin using the AS resin as a matrix resin, it is expected that the same effects as those shown in the examples can be exerted. On the other hand, the maleimide-based copolymers of Comparative Examples 1 to 7 (Comp. Exam. 1 to 7) were out of the scope of the present invention. The resin compositions of Comparative Examples 8 to 16 (Comp. Exam. 8 to 16) in which the maleimide-based copolymer and the ABS resin were mixed were inferior in any of the impact resistance, fluidity, heat resistance, chemical resistance, and hue.

INDUSTRIAL APPLICABILITY

A resin composition having an excellent balance of physical properties for the hue, chemical resistance, heat resistance, impact resistance, and fluidity by mixing the maleimide-based copolymer of the present invention with the ABS resin, the ASA resin, the AES resin or the SAN resin can be obtained. The obtained resin composition can be suitably used as a material for an interior member or an exterior member of an automobile.

The embodiments of the invention in which an exclusive property or privilege is claimed are defined as follows:

1. A maleimide-based copolymer comprising 40 to 60% by mass of an aromatic vinyl monomer units, 5 to 20% by mass of a vinyl cyanide monomer units, 35 to 50% by mass of a maleimide-based monomer units, and 0.5 to 10% by mass of unsaturated dicarboxylic anhydride monomer units in the maleimide-based copolymer, wherein a tetrahydrofuran solution containing 4% by mass of the copolymers has a transmittance of 90% or more for light having a wavelength of 450 nm at an optical path length of 10 mm, an amount of the residual maleimide-based monomers is less than 300 ppm, and wherein the vinyl cyanide monomer units are present at greater than 5%.

2. The maleimide-based copolymer according to claim 1, comprising a glass transition temperature of 165° C. or higher.

* * * * *